US010227001B2

(12) United States Patent
Yoshisaka et al.

(10) Patent No.: US 10,227,001 B2
(45) Date of Patent: Mar. 12, 2019

(54) DIFFERENTIAL UNIT

(71) Applicant: JTEKT CORPORATION, Osaka-shi (JP)

(72) Inventors: Tadashi Yoshisaka, Kariya (JP); He Jin, Kariya (JP); Yasunori Kamitani, Fujimi (JP)

(73) Assignee: JTEKT CORPORATION, Osaka-shi (JP)

( * ) Notice: Subject to any disclaimer, the term of this patent is extended or adjusted under 35 U.S.C. 154(b) by 52 days.

(21) Appl. No.: 15/645,171

(22) Filed: Jul. 10, 2017

(65) Prior Publication Data

US 2018/0043774 A1 Feb. 15, 2018

(30) Foreign Application Priority Data

Aug. 10, 2016 (JP) .................................. 2016-157559

(51) Int. Cl.
*B60K 23/04* (2006.01)
*F16D 27/112* (2006.01)
(Continued)

(52) U.S. Cl.
CPC .............. *B60K 23/04* (2013.01); *F16D 13/76* (2013.01); *F16D 27/112* (2013.01); *F16H 48/22* (2013.01);
(Continued)

(58) Field of Classification Search
CPC ......... B60K 23/04; F16H 48/22; F16H 48/34; F16H 2048/346; F16H 48/08; F16D 13/76; F16D 27/112
See application file for complete search history.

(56) References Cited

U.S. PATENT DOCUMENTS

| 1,332,535 | A | * | 3/1920 | Baker | ..................... F16H 48/06 475/230 |
| 2002/0132694 | A1 | * | 9/2002 | Okazaki | .................. F16H 48/08 475/231 |

(Continued)

FOREIGN PATENT DOCUMENTS

JP 2015-87015 5/2015

*Primary Examiner* — David J Hlavka
(74) *Attorney, Agent, or Firm* — Oblon, McClelland, Maier & Neustadt, L.L.P.

(57) ABSTRACT

A differential unit includes: a differential case; a differential mechanism; a connecting-disconnecting member that connects the differential case to the differential mechanism; an actuator that generates a moving force for moving the connecting-disconnecting member; a moving-force transmitting member that transmits the moving force generated by the actuator to the connecting-disconnecting member; and a wave washer that urges the connecting-disconnecting member in a direction opposite to a direction in which the connecting-disconnecting member is moved by the actuator. The actuator includes a plunger that moves while compressing the wave washer in the axial direction from a first prescribed length using a magnetic force of an electromagnet. A movement of the plunger in a direction away from the connecting-disconnecting member is restricted by a contacting portion of a restricting member. An axial clearance is formed between the plunger and the contacting portion when the wave washer is at the first prescribed length.

6 Claims, 6 Drawing Sheets

(51) Int. Cl.
　　　*F16D 13/76*　　　(2006.01)
　　　*F16H 48/22*　　　(2006.01)
　　　*F16H 48/34*　　　(2012.01)
　　　*F16H 48/08*　　　(2006.01)

(52) U.S. Cl.
　　　CPC ............ *F16H 48/34* (2013.01); *F16H 48/08* (2013.01); *F16H 2048/346* (2013.01)

(56) References Cited

U.S. PATENT DOCUMENTS

| | | | |
|---|---|---|---|
| 2003/0184171 A1* | 10/2003 | Teraoka | F16H 48/24 310/80 |
| 2004/0166985 A1* | 8/2004 | Sudou | F16H 48/08 475/230 |
| 2015/0114786 A1 | 4/2015 | Seidl | |

* cited by examiner

DIFFERENTIAL UNIT

INCORPORATION BY REFERENCE

The disclosure of Japanese Patent Application No. 2016-157559 filed on Aug. 10, 2016 including the specification, drawings and abstract, is incorporated herein by reference in its entirety.

BACKGROUND OF THE INVENTION

1. Field of the Invention

The invention relates to a differential unit including a differential mechanism configured to receive a driving force and output the driving force from a pair of output members while allowing the output members to rotate at different rotational speeds.

2. Description of the Related Art

A differential unit configured to receive a driving force and output the driving force from a pair of output members while allowing the output members to rotate at different rotational speeds has been used as, for example, a vehicle differential unit. In some differential units of this kind, transmission of a received driving force to the output members can be interrupted. See, for example, Japanese Patent Application Publication No. 2015-87015 (JP 2015-87015 A).

A differential unit described in JP 2015-87015 A includes: a differential mechanism including two differential gears and two side shaft gears that are supported on a journal in the form of a shaft; a differential case (housing) in which the differential mechanism is housed; a carrier element rotatably housed in the differential case; a second clutch portion fixed to the carrier element; a first clutch portion configured to be engaged with the second clutch portion; an actuator configured to move the first clutch portion in an axial direction relative to the second clutch portion; a return spring configured to move the first clutch portion away from the second clutch portion; and a target element urged by the return spring.

A driving force is input into the differential case from a driving gear that is fixed to an outer peripheral surface of the differential case by welding or with fastening bolts. The carrier element has two bores, and the journal is inserted into the bores and fixed with a fixing pin.

The first clutch portion includes an annular portion and a plurality of axial protrusions protruding in the axial direction from the annular portion, and a toothed ring segment to be engaged with the second clutch portion is provided at a distal end of each axial protrusion. The annular portion of the first clutch portion is disposed outside the differential case, and the axial protrusions are passed through axial holes provided in a side wall of the differential case. Thus, the first clutch portion is connected to the differential case so as to be movable relative to the differential case in the axial direction and so as to be non-rotatable relative to the differential case.

The actuator includes an electromagnet, and a piston that is a combination of an anchor element made of a magnetic material and a sleeve made of a non-magnetic material. A sliding disc is disposed between the sleeve and the first clutch portion. When a current is applied to the electromagnet, the piston moves the first clutch portion toward the second clutch portion using a magnetic force generated by the electromagnet. When application of a current to the electromagnet is interrupted, the first clutch portion is moved away from the second clutch portion by an urging force of the return spring applied to the first clutch portion via the target element.

When the first clutch portion moves in the axial direction toward the second clutch portion in response of activation of the actuator, the toothed ring segments of the axial protrusions are engaged with the second clutch portion, and the carrier element rotates together with the differential case in an integrated manner. Thus, the driving force input into the differential case from the driving gear is transmitted to the differential gears via the first clutch portion, the second clutch portion, and the carrier element.

On the other hand, when the actuator is deactivated, the first clutch portion is moved away from the second clutch portion by the return spring, so that the first clutch portion and the second clutch portion are no longer engaged with each other and the carrier element is allowed to rotate relative to the differential case. Thus, transmission of the driving force from the differential case to the differential mechanism is interrupted.

While the actuator is in a deactivated state, friction due to relative rotation is generated between the sliding disc and the first clutch portion or the sleeve, by the urging force of the return spring. This friction may cause abrasion of these members or cause unnecessary rotational resistance.

SUMMARY OF THE INVENTION

One object of the invention is to provide a differential unit configured to allow or interrupt transmission of a driving force through activation or deactivation of an actuator, and to suppress generation of friction between rotational members while the actuator is deactivated.

A differential unit according to an aspect of the invention includes: a differential case rotatably supported inside a differential carrier; a differential mechanism disposed inside the differential case, and the differential mechanism configured to receive a driving force and output the driving force from a pair of output members while allowing the output members to rotate at different rotational speeds; a connecting-disconnecting member configured to be movable, in an axial direction that is a direction parallel to a rotational axis of the differential case, between a connection position at which the differential case and the differential mechanism are connected to each other and a disconnection position at which the differential case and the differential mechanism are disconnected from each other, and the connecting-disconnecting member configured to allow or interrupt transmission of the driving force from the differential case to the differential mechanism; an actuator configured to generate a moving force for moving the connecting-disconnecting member in the axial direction; a moving-force transmitting member disposed so as to be movable in the axial direction relative to the differential case and so as to be non-rotatable relative to the differential case, and the moving-force transmitting member configured to transmit the moving force generated by the actuator to the connecting-disconnecting member; and an elastic member configured to urge the connecting-disconnecting member in a direction opposite to a direction in which the connecting-disconnecting member is moved by the moving force generated by the actuator. The actuator includes an electromagnet having an annular shape and prevented from rotating relative to the differential carrier, and a plunger made of a soft magnetic material and configured to move in the axial direction while reducing a length of the elastic member from a first prescribed length to a second prescribed length using a magnetic force generated in response to application of a current to the electromagnet. An axial movement of the plunger in a direction away from the connecting-disconnecting member is restricted by a restricting member having a contacting portion to be brought into contact with the plunger. A clearance in the axial direction is formed between the plunger and the contacting portion when the elastic member is at the first prescribed length.

With the differential unit according to the above aspect, it is possible to allow or interrupt transmission of a driving force through activation or deactivation of the actuator, and to suppress generation of friction between rotational members while the actuator is deactivated.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Example embodiments of the invention will be described with reference to FIG. 1 to FIG. 5B.

Figure 1:
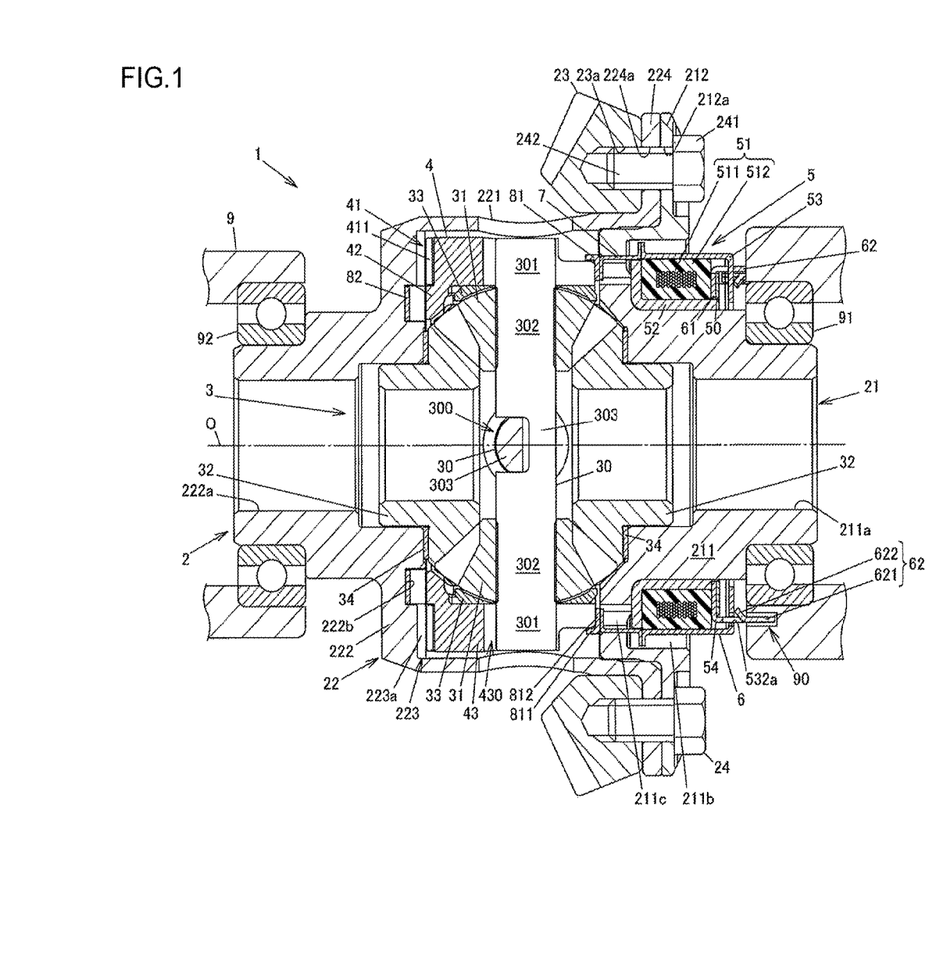
FIG. 1 is a sectional view illustrating an example of the configuration of a differential unit according to an embodiment of the invention.
Figure 2:
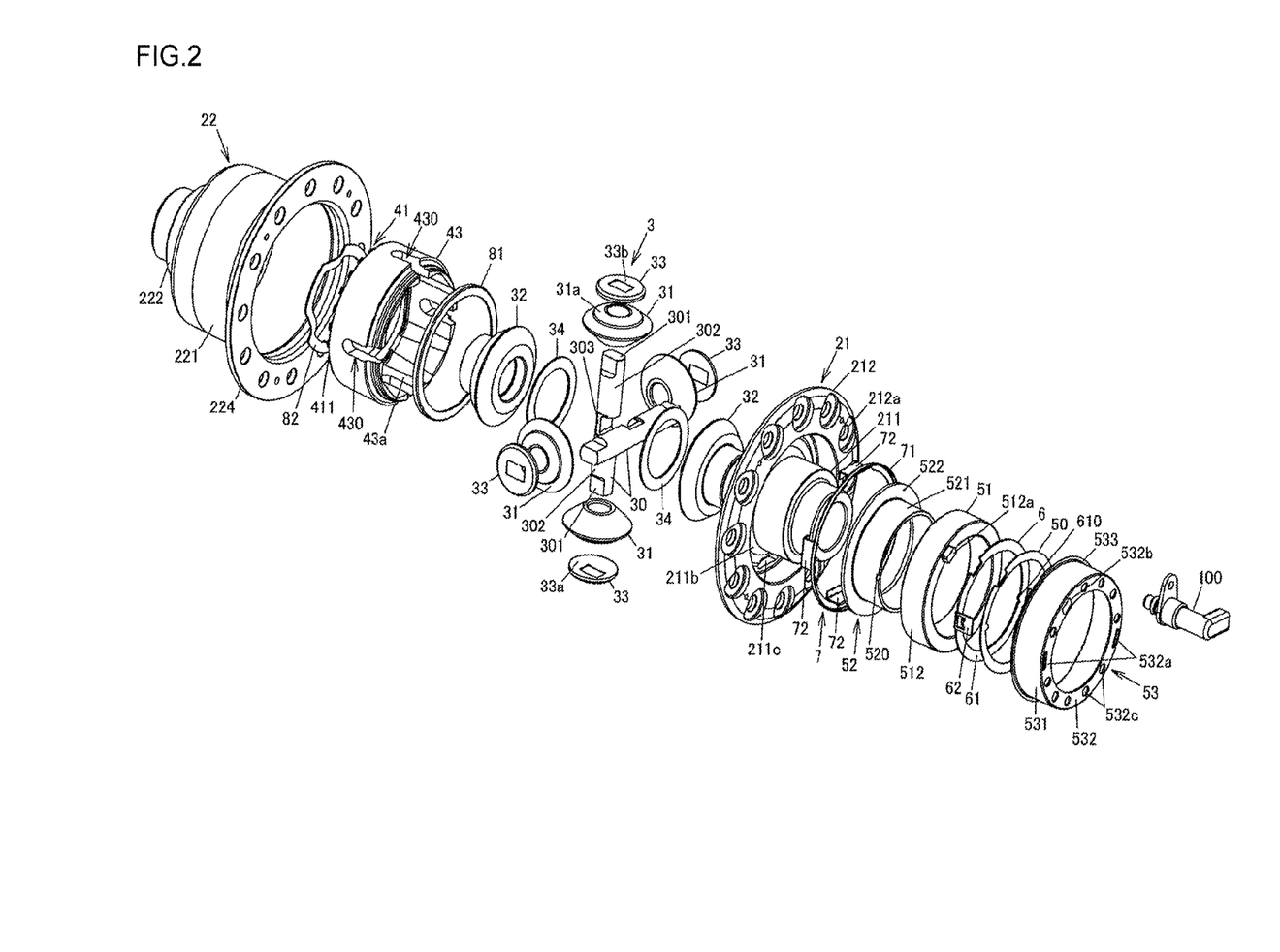
FIG. 2 is an exploded perspective view of the differential unit.
Figure 3:
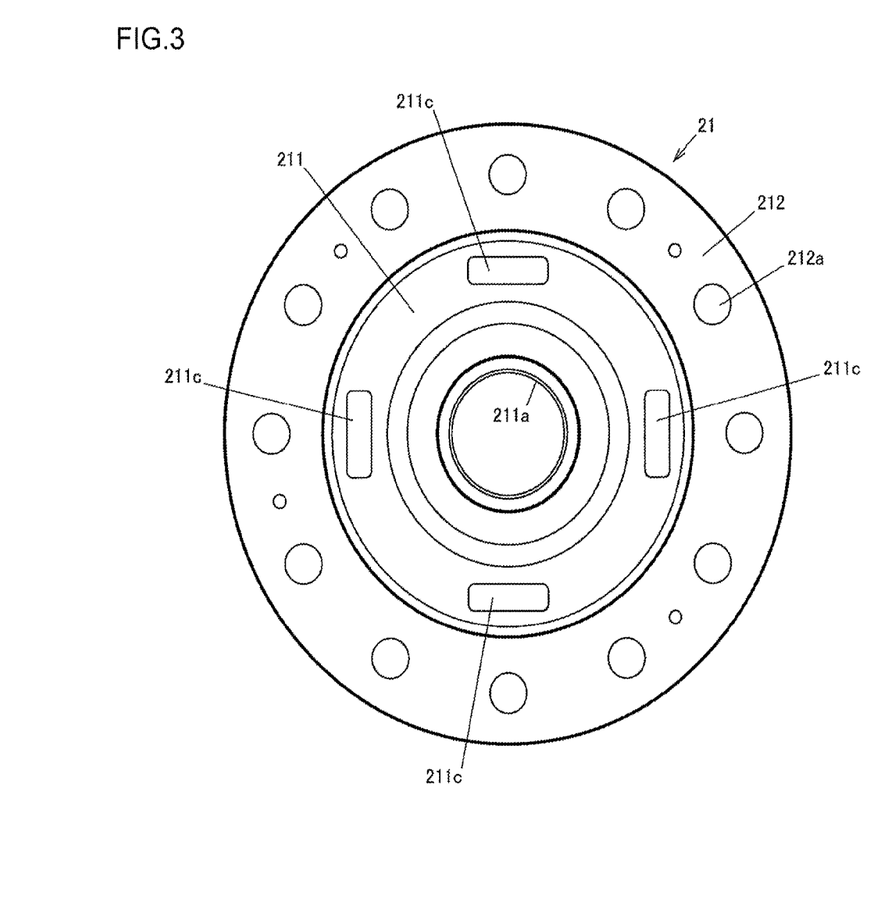
FIG. 3 is a plan view of an inner surface of a first case member of a differential case as seen in an axial direction.
Figure 4:
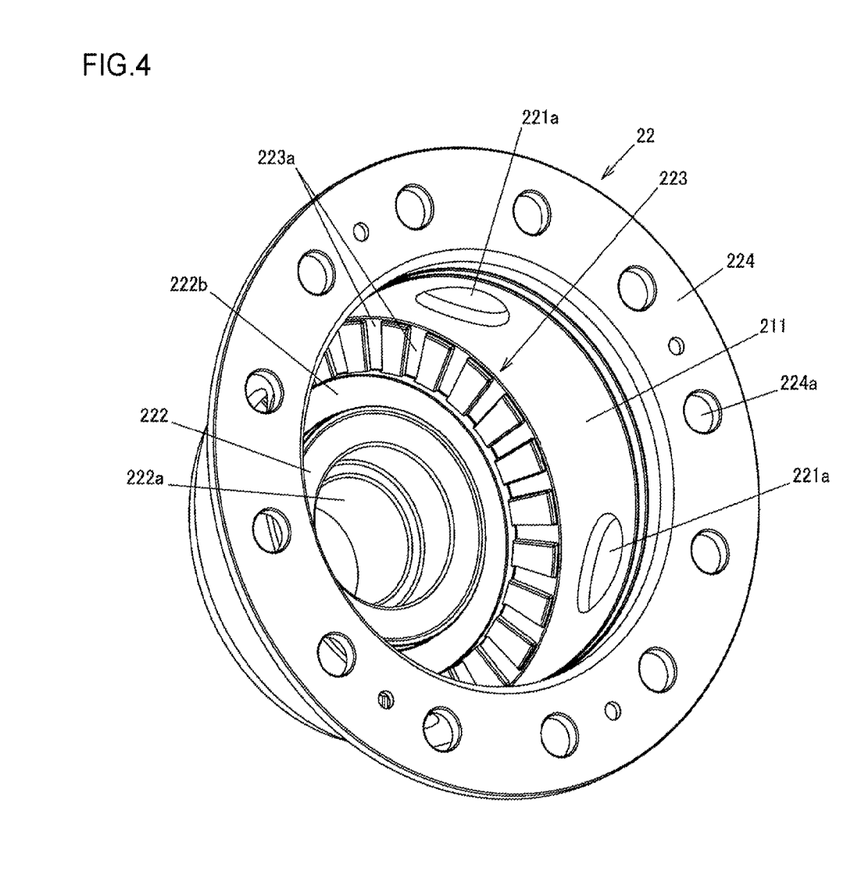
FIG. 4 is a perspective view illustrating a second case member of the differential case.
Figure 5A:
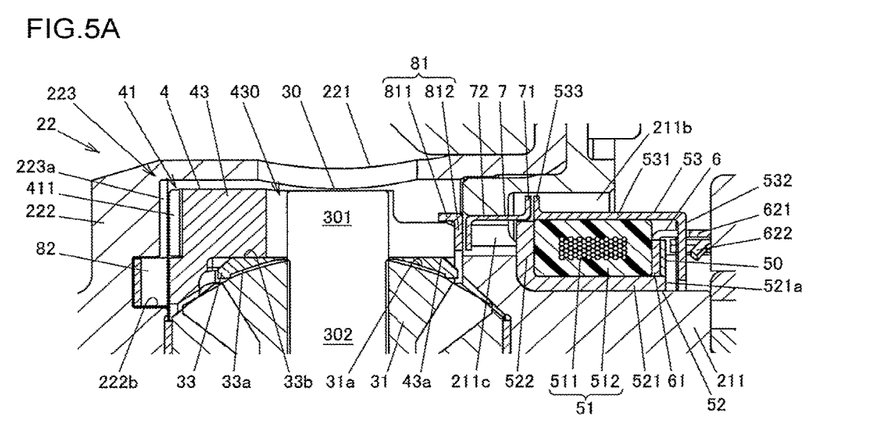
FIG. 5A is a partially-enlarged view of FIG. 1, illustrating a deactivated state of an actuator.
Figure 5B:
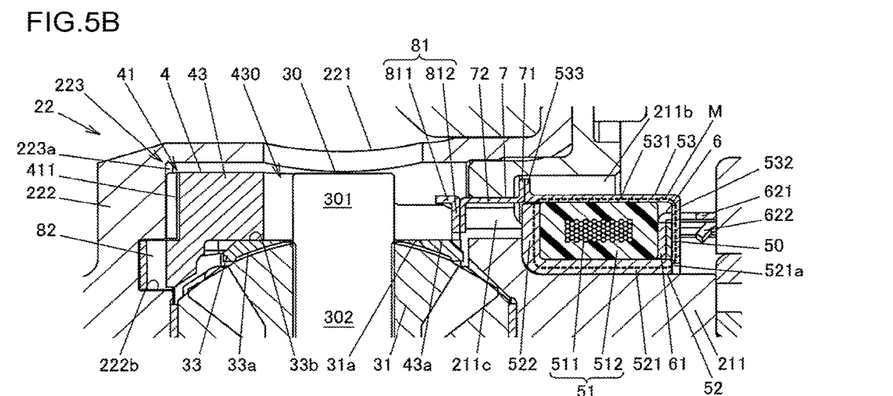
FIG. 5B is a partially-enlarged view of FIG. 1, illustrating an activated state of the actuator.

FIG. 1 is a sectional view illustrating an example of the configuration of a differential unit according to an embodiment of the invention. FIG. 2 is an exploded perspective view of the differential unit. FIG. 3 is a plan view of an inner surface of a first case member of a differential case as seen in an axial direction. FIG. 4 is a perspective view illustrating a second case member of the differential case. FIG. 5A is a partially-enlarged view of FIG. 1, illustrating a deactivated state of an actuator. FIG. 5B is a partially-enlarged view of FIG. 1, illustrating an activated state of the actuator.

A differential unit 1 is used to distribute a driving force from a driving source, such as a vehicle engine, to a pair of output shafts while allowing the output shafts to rotate at different rotational speeds. More specifically, the differential unit 1 according to the present embodiment is mounted in a four-wheel-drive vehicle provided with a pair of right and left main drive wheels (e.g., front wheels) to which a driving force from a driving source is always transmitted, and a pair of right and left sub-drive wheels (e.g., rear wheels) to which the driving force from the driving source is transmitted depending on the traveling state. The differential unit 1 is used as a differential unit configured to distribute the driving force to the right and left sub-drive wheels. When the driving force is transmitted to only the main drive wheels, the vehicle is in a two-wheel-drive state. On the other hand, when the driving force is transmitted to the main drive wheels and the sub-drive wheels, the vehicle is in a four-wheel-drive state. In the four-wheel-drive state, the differential unit 1 distributes the received driving force to right and left drive shafts that are connected to the sub-drive wheels.

The differential unit 1 includes: a differential case 2 rotatably supported, via a pair of bearings 91, 92, inside a differential carrier 9 fixed to a vehicle body; a differential mechanism 3 disposed inside the differential case 2; a connecting-disconnecting member 4 configured to allow or interrupt transmission of a driving force between the differential case 2 and pinion shafts 30 of the differential mechanism 3; an actuator 5 configured to generate a moving force for moving the connecting-disconnecting member 4 in the axial direction; a restricting member 6 configured to restrict the axial movement of a plunger 53 (described later) of the actuator 5; a moving-force transmitting member 7 interposed between the connecting-disconnecting member 4 and the actuator 5 and configured to transmit the moving force generated by the actuator 5 to the connecting-disconnecting member 4; a washer 81 fitted to the connecting-disconnecting member 4, and a wave washer 82 that may function as an elastic member, and that is configured to urge the connecting-disconnecting member 4 in a direction opposite to the direction in which the connecting-disconnecting member 4 is moved by the moving force generated by the actuator 5.

The differential mechanism 3 includes the pinion shafts 30 to which the driving force is transmitted from the differential case 2 via the connecting-disconnecting member 4, a plurality of (four) pinion gears 31 rotatably supported around a rotational axis O of the differential case 2, and a pair of side gears 32, which may function as a pair of output members. While the actuator 5 is deactivated, the pinion shafts 30 can rotate about the rotational axis O, which is the rotational axis shared by the pinion shafts 30 and the differential case 2, relative to the differential case 2. The differential mechanism 3 outputs the driving force transmitted to the pinion shafts 30, each of which may function as an input member, from the side gears 32, which may function as a pair of output members, while allowing the side gears 32 to rotate at different rotational speeds. In the following description, the axial direction means a direction parallel to the rotational axis O.

In the present embodiment, the differential mechanism 3 includes a pair of the pinion shafts 30, and two pinion gears 31 of the four pinion gears 31 are rotatably supported on one of the pinion shafts 30, whereas the other two pinion gears 31 are rotatably supported on the other one of the pinion shafts 30. The pinion gears 31 and the side gears 32 are bevel gears. The pinion gears 31 are meshed with the side gears 32 such that the gear axis of each pinion gear 31 and the gear axis of each side gear 32 are perpendicular with each other. The right and left drive shafts are respectively connected to the side gears 32 such that the drive shafts are non-rotatable relative to the side gears 32. Although each pinon gear 31 and each side gear 32 has a plurality of gear teeth, the gear teeth are omitted in FIG. 2.

Each pinion shaft 30 is a single-piece member having a pair of engaged portions 301 to be engaged with the connecting-disconnecting member 4, a pair of pinion gear supporting portions 302 to be passed through the pinion gears 31, and a connecting portion 303 that connects the pinion gear supporting portions 302 together. Each pinion shaft 31 has a shaft shape as a whole. The engaged portions 301 are provided at respective end portions of the pinion shaft 30, and the connecting portion 303 is provided at a center portion of the pinion shaft 30 in its axial direction. Each of the pinion gear supporting portions 302 is provided between a corresponding one of the engaged portions 301 and the connecting portion 303. The pinion gear 31 is rotatably supported by the pinion gear supporting portions 302.

The pinion shafts 30 are engaged with each other, at the center portions in their axial direction. Specifically, the connecting portion 303 of one of the pinion shafts 30 is fitted in a recess 300 provided between the pinion gear supporting portions 302 of the other one of the pinion shafts 30, and the connecting portion 303 of the other one of the pinion shaft 30 is fitted in a recess 300 provided between the pinion gear supporting portions 302 of the one of the pinion shafts 30. The pinion shafts 30 are perpendicular to each other as viewed in the direction of the rotational axis O of the differential case 2.

The connecting-disconnecting member 4 has a cylindrical shape having a central axis that coincides with the rotational axis O of the differential case 2. The connecting-disconnecting member 4 is formed by forging a steel material. The connecting-disconnecting member 4 is movable relative to the pinion shafts 30 of the differential mechanism 3 in a central axis direction along the rotational axis O of the differential case 2, and the rotation of the connecting-disconnecting member 4 relative to the pinion shafts 30 is restricted.

The connecting-disconnecting member 4 is a single-piece member having a first meshing portion 41 having a plurality of meshing teeth 411 provided at one end portion of the connecting-disconnecting member 4 in the central axis direction, an inner rib portion 42 having an annular shape and provided radially inward of the first meshing portion 41 so as to protrude in the central axis direction, and a cylindrical portion 43 having engagement portions 430 with which the pinion shafts 30 are engaged with the circumferential direction. The first meshing portion 41 is meshed with a second meshing portion 223 (described later) of the differential case 2 in the circumferential direction. When an axial end surface of the inner rib portion 42 is in contact with the wave washer 82, the inner rib portion 42 receives an urging force of the wave washer 82. The engagement portions 430 are grooves passing through the cylindrical portion 43 from its inner peripheral surface to its outer peripheral surface and extending in the central axis direction of the connecting-disconnecting member 4.

The engaged portions 301 provided at respective end portions of the pinion shafts 30 are engaged with the engagement portions 430. When the engaged portions 301 are engaged with the engagement portions 430, the rotation of the pinion shafts 30 relative to the connecting-disconnecting member 4 is restricted. The connecting-disconnecting member 4 is movable relative to the pinion shafts 30 in the central axis direction along the rotational axis O, and is non-rotatable relative to the pinion shafts 30. The pinion gears 31 can rotate (turn) around the rotational axis O of the differential case 2, along with the connecting-disconnecting member 4. In the present embodiment, the engaged portions 301 provided at respective end portions of each of the pinion shafts 30 are engaged with the connecting-disconnecting member 4, and thus the cylindrical portion 43 has four engagement portions 430.

A washer 33 is disposed between a back surface 31a of each of the pinion gears 31 and an inner peripheral surface 43a of the cylindrical portion 43 of the connecting-disconnecting member 4. An inner surface 33a of the washer 33, which faces the back surface 31a of the pinion gear 31, is a partially spherical surface, whereas an outer surface 33b of the washer 33, which faces the inner peripheral surface 43a of the cylindrical portion 43 of the connecting-disconnecting member 4, is a flat surface. When each pinion gears 31 rotate (turn) around the rotational axis O of the differential case 2, the back surfaces 31a of the pinion gears 31 slide over the inner surfaces 33a of the washers 33. When the connecting-disconnecting member 4 moves relative to the pinion shaft 30 in the central axis direction, the inner peripheral surface 43a of the cylindrical portion 43 of the connecting-disconnecting member 4 slides over the outer surfaces 33b of the washers 33. A portion of the inner peripheral surface 43a of the cylindrical portion 43, which slides over the outer surfaces 33b of the washers 33, is a flat surface.

The moving-force transmitting member 7 is disposed so as to be movable relative to the differential case 2 in the axial direction and non-rotatable relative to the differential case 2. The moving-force transmitting member 7 has a base portion 71 having an annular shape and disposed outside the differential case 2, and a plurality of shaft portions 72 extending in the axial direction from the base portion 71. In the present embodiment, the moving-force transmitting member 7 has four shaft portions 72 arranged at prescribed intervals in the circumferential direction. The moving-force transmitting member 7 is made of a non-magnetic material, and is formed by pressing a steel sheet made of, for example, austenitic stainless steel. Distal end portions of the shaft portions 72 (end portions on the opposite side of the shaft portions 72 from base end portions on the base portion 71-side) are bent radially inward.

The washer 81 having an L-shaped section is disposed between the distal end portions of the shaft portions 72 and the cylindrical portion 43 of the connecting-disconnecting member 4. The washer 81 has a cylindrical portion 811, and a disc portion 812 extending radially inward from one axial end of the cylindrical portion 811. The cylindrical portion 811 is fitted and fixed to the cylindrical portion 43 of the connecting-disconnecting member 4. The distal end portions of the shaft portions 72 of the moving-force transmitting member 7 are in contact with the disc portion 812 of the washer 81.

The actuator 5 includes: an electromagnet 51 having an annular shape and including a coil 511 that generates magnetic fluxes when a current is applied thereto, and a resin member 512 that covers the coil 511; a yoke 52 that holds the electromagnet 51; and the plunger 53 that moves along with the connecting-disconnecting member 4 in the axial direction. The electromagnet 51, the yoke 52, and the plunger 53 are disposed outside the differential case 2. The electromagnet 51 has a rectangular sectional shape along the rotational axis O. The electromagnet 51 is formed, for example, through a molding process in which the coil 511, formed by winding an enameled wire, is embedded in the resin member 512.

The plunger 53 is moved in the axial direction by a magnetic force generated in response to the application of a current to the electromagnet 51, thereby moving the connecting-disconnecting member 4 in a direction in which the first meshing portion 41 is meshed with the second meshing portion 223 of the differential case 2. The first meshing portion 41 is meshed with the second meshing portion 223 by the moving force generated by the actuator 5, which is transmitted to the connecting-disconnecting member 4 via the moving-force transmitting member 7.

The plunger 53 is made of a soft magnetic material, such as low-carbon steel. The plunger 53 is a single-piece member having: an outer cylindrical portion 531 that may function as a first cylindrical portion, and that is disposed radially outward of the electromagnet 51 so as to face the electromagnet 51 in the radial direction; a side wall portion 532 protruding radially inward from one axial end of the outer cylindrical portion 531; and a flange portion 533 protruding radially outward from the other axial end of the outer cylindrical portion 531. The outer cylindrical portion 531 has a cylindrical shape, and has an inner peripheral surface that is parallel to an outer peripheral surface of the electromagnet 51.

The plunger 53 is supported on the electromagnet 51, with the inner peripheral surface of the outer cylindrical portion 531 kept in contact with an outer peripheral surface of the resin member 512 of the electromagnet 51. When the plunger 53 moves in the axial direction, the inner peripheral surface of the outer cylindrical portion 531 slides over the outer peripheral surface of the resin member 512. That is, the inner peripheral surface of the outer cylindrical portion 531 is kept in contact with the outer peripheral surface of the resin member 512 of the electromagnet 51, whereby the plunger 53 is supported on the resin member 512 in the radial direction.

The yoke 52 is made of a soft magnetic material, such as low-carbon steel. The yoke 52 is a single-piece member having: an inner cylindrical portion 521 that may function as a second cylindrical portion, and that faces the electromagnet 51 in the radial direction such that the electromagnet 51 is held between the outer cylindrical portion 531 of the plunger 53 and the inner cylindrical portion 521; and a rib portion 522 having an annular plate shape, and extending in the radial direction from one axial end of the inner cylindrical portion 521 to cover one axial end surface of the resin member 512. The inner cylindrical portion 521 has a cylindrical shape having a central axis that coincides with the rotational axis O, and is disposed between the differential case 2 and the electromagnet 51. The rib portion 522 extends radially outward from one end of the inner cylindrical portion 521 such that the electromagnet 51 is held between the side wall portion 532 of the plunger 53 and the rib portion 522 in the axial direction.

The electromagnet 51 is prevented from rotating relative to the differential carrier 9, and is held by the yoke 52. An excitation current is supplied to the coil 511 of the electromagnet 51 through a wire (not illustrated) extending from a boss 512a (see FIG. 2) of the resin member 512. When a current is applied to the coil 511, the plunger 53 is moved in the axial direction by the magnetic fluxes that pass through a magnetic path constituted by the yoke 52 and the plunger 53. As a result, the actuator 5 is activated.

The inner diameter of the inner cylindrical portion 521 of the yoke 52 is slightly larger than the outer diameter of a portion of the differential case 2, which faces an inner peripheral surface of the inner cylindrical portion 521. Thus, the differential case 2 can rotate relative to the yoke 52.

The restricting member 6 is fixed to an end portion of the inner cylindrical portion 521 of the yoke 52. The end portion of the inner cylindrical portion 521, to which the restricting member 6 is fixed, is on the opposite side of the inner cylindrical portion 521 from the rib portion 522. The restricting member 6 is made of a non-magnetic material, such as austenitic stainless steel. The restricting member 6 is a single-piece member having: a fixed portion 61 having an annular shape, and fixed to an outer periphery of the inner cylindrical portion 521 of the yoke 52; and a pair of projection pieces 62. The projection pieces 62 are provided at a plurality of positions (two positions in the present embodiment) in the circumferential direction so as to project in the axial direction from the fixed portion 61. Each projection piece 62 has an engagement portion 621 to be engaged with a recess 90 of the differential carrier 9, and a contacting portion 622 that comes into contact with the side wall portion 532 of the plunger 53, thereby restricting the axial movement of the plunger 53 in a direction away from the connecting-disconnecting member 4. When each engagement portion 621 is engaged with the recess 90, the axial movement and rotation of the restricting member 6 relative to the differential carrier 9 are restricted. The contacting portion 622 is formed by cutting and raising a portion of the projection piece 62.

The fixed portion 61 of the restricting member 6 has protrusions 610 protruding from a radially-inner end portion of the fixed portion 61. The protrusions 610 are engaged with recesses 520 provided in the inner cylindrical portion 521 of the yoke 52, whereby the fixed portion 61 is prevented from rotating. The fixed portion 61 has two protrusions 610, and the protrusions 610 are respectively engaged with the recesses 520 provided at two positions in the inner cylindrical portion 521. In FIG. 2, one of the protrusions 610 and one of the recesses 520 are illustrated. The fixed portion 61 is held, in the axial direction, between the electromagnet 51 and a stopper ring 50 having an annular shape and connected to the inner cylindrical portion 521 of the yoke 52, and thus the position of the fixed portion 61 in the axial direction relative to the yoke 52 is determined. The stopper ring 50 is fixed to the outer peripheral surface of the inner cylindrical portion 521 of the yoke 52, for example, by welding.

The side wall portion 532 of the plunger 53 has a pair of insertion holes 532a through which the projection pieces 62 of the restricting member 6 are respectively inserted, a through-hole 532b through which the boss 512a of the electromagnet 51 passes, and a plurality of (10 in the example illustrated in FIG. 2) oil holes 532c through which lubricating oil flows. The boss 512a passes through the through-hole 532b, whereby the electromagnet 51 is prevented from rotating relative to the yoke 52. The projection pieces 62 of the restricting member 6 pass through the insertion holes 532a, the plunger 53 is prevented from rotating relative to the differential carrier 9.

The differential case 2 includes a first case member 21 having a disc shape, and a second case member 22 having a bottomed cylinder shape. The first case member 21 closes an opening of the second case member 22. Washers 34 having an annular plate shape are disposed respectively between the side gears 32 of the differential mechanism 3 and the first and second case members 21, 22. Lubricating oil (differential oil) for lubricating the differential mechanism 3 is introduced into the differential case 2.

As illustrated in FIG. 4, the second case member 22 is a single-piece member having: a cylindrical portion 221 in which the differential mechanism 3 and the connecting-disconnecting member 4 are housed; a bottom portion 222 extending inward from one axial end of the cylindrical portion 221; the second meshing portion 223 to be meshed with the first meshing portion 41 of the connecting-disconnecting member 4; and a flange portion 224 extending radially outward from the other axial end of the cylindrical portion 221. The cylindrical portion 221 has a plurality of oil holes 221a through which the lubricating oil flows. The bottom portion 222 has a shaft insertion hole 222a through which a drive shaft is inserted, and an annular groove 222b in which the wave washer 82 is housed. The drive shaft is connected to one of the side gears 32 so as to be non-rotatable relative to the one of the side gears 32.

The second meshing portion 223 is constituted by a plurality of meshing teeth 223a arranged at regular intervals along the circumferential direction. The second meshing portion 223 is provided near the bottom portion 222 of the second case member 22. In the present embodiment, the meshing teeth 223a protrude in the axial direction from an inner surface of the bottom portion 222. The wave washer 82 urges the connecting-disconnecting member 4 in a direction in which the connecting-disconnecting member 4 is moved away from the bottom portion 222 of the second case member 22.

The first case member 21 is a single-piece member having: a disc portion 211 that faces the bottom portion 222 of the second case member 22 in the axial direction; and a flange portion 212 to be brought into contact with the flange portion 224 of the second case member 22. The disc portion 211 has a shaft insertion hole 211a through which a drive shaft is inserted. The drive shaft is connected to the other one of the side gears 32 so as to be non-rotatable relative to the other one of the side gears 32. The disc portion 211 has an annular groove 211b and a plurality of through-holes 211c. The annular groove 211b is recessed in the axial direction from an outer surface of the disc portion 211, which is on the opposite side of the disc portion 211 from a surface thereof facing the bottom portion 222 of the second case member 22. The through-holes 211c are communicated with the annular groove 211b, and extend through the disc portion 211 in the axial direction.

In the annular groove 211b of the first case member 21, the electromagnet 51, the yoke 52, the plunger 53, and the moving-force transmitting member 7 are each partially housed. The base portion 71 of the moving-force transmitting member 7 is disposed in the annular groove 211b, and the shaft portions 72 of the moving-force transmitting member 7 are respectively passed through the through-holes 211c of the first case member 21. The shaft portions 72 are passed through the through-holes 211c, whereby the moving-force transmitting member 7 is supported by the first case member 21 in the radial direction.

A driving force is input into the differential case 2 from a ring gear 23 having an annular shape (see FIG. 1) and fixed to the flange portions 212, 224 of the first and second case members 21, 22. The ring gear 23 is fixed to an outer periphery of the cylindrical portion 221 of the second case member 22, at a position on the flange portion 224-side. In the present embodiment, the ring gear 23 is fixed to the differential case 2 so as to be rotatable together with the differential case 2 in an integrated manner, with a plurality of fastening bolts 24 passed through a plurality of bolt insertion holes 212a provided in the flange portion 212 of the first case member 21 and a plurality of bolt insertion holes 224a provided in the flange portion 224 of the second case member 22. Each fastening bolt 24 is screwed into a screw hole 23a of the ring gear 23 in such a manner that a head portion 241 comes into contact with the flange portion 212 of the first case member 21 and a shaft portion 242 having a male thread is passed through the bolt insertion holes 212a, 224a.

Through activation and deactivation of the actuator 5, the differential unit 1 is switched between a connected state and a disconnected state. In the connected state, the first meshing portion 41 and the second meshing portion 223 are meshed with each other in the circumferential direction, and the connecting-disconnecting member 4 and the differential case 2 are connected to each other so as to be non-rotatable relative to each other. In the disconnected state, the connecting-disconnecting member 4 and the differential case 2 are rotatable relative to each other.

When the actuator 5 is in a deactivated state where an excitation current is not supplied to the coil 511 of the electromagnet 51, the connecting-disconnecting member 4 is moved toward the disc portion 211 of the first case member 21 by a restoring force of the wave washer 82, so that the first meshing portion 41 and the second meshing portion 223 are no longer meshed with each other. When the actuator 5 is in the deactivated state, the differential case 2 and the connecting-disconnecting member 4 are rotatable relative to each other, so that transmission of a driving force from the differential case 2 to the pinion shafts 30 of the differential mechanism 3 is interrupted. Thus, the driving force input into the differential case 2 from the ring gear 23 is not transmitted to the drive shafts. As a result, the vehicle enters a two-wheel-drive state.

On the other hand, when an excitation current is supplied to the coil 511 of the electromagnet 51, magnetic fluxes are generated in a magnetic path M indicated by a dashed line in FIG. 5B. Then, the plunger 53 is moved in the axial direction by a magnetic force of the electromagnet 51 such that the side wall portion 532 of the plunger 53 approaches an axial end surface 521a of the inner cylindrical portion 521 of the yoke 52. As a result, the axial length of the wave washer 82 decreases from a first prescribed length to a second prescribed length, and the connecting-disconnecting member 4 is pressed toward the bottom portion 222 of the second case member 22 via the moving-force transmitting member 7, so that the first meshing portion 41 and the second meshing portion 223 are meshed with each other. The base portion 71 of the moving-force transmitting member 7 comes into contact with the flange portion 533 of the plunger 53, and receives a moving force in the axial direction from the plunger 53.

In this way, the connecting-disconnecting member 4 is movable in the axial direction between a connection position at which the meshing teeth 411 are meshed with the second meshing portion 223 of the differential case 2, and a disconnection position at which the meshing teeth 411 are not meshed with the second meshing portion 223 of the differential case 2. The plunger 53 moves in the axial direction while reducing the length of the wave washer 82 from the first prescribed length to the second prescribed length.

When the first meshing portion 41 and the second meshing portion 223 are meshed with each other, the driving force input into the second case member 22 of the differential case 2 from the ring gear 23 is transmitted to the drive shafts via the connecting-disconnecting member 4 and the two pinion shafts 30, the four pinion gears 31, and the two side gears 32 of the differential mechanism 3. As a result, the vehicle enters a four-wheel-drive state.

When the actuator 5 is in the deactivated state where application of a current to the electromagnet 51 is interrupted, the axial length of the wave washer 82 is the first prescribed length. In the present embodiment, the first prescribed length is the axial length of the wave washer 82 in a natural state where the wave washer 82 is not compressed. In the natural state of the wave washer 82, as illustrated in FIG. 5A, the connecting-disconnecting member 4, the moving-force transmitting member 7, and the plunger 53 are disposed between the wave washer 82 and the contacting portion 622 of the restricting member 6, with backlashes left in the axial direction.

FIG. 5A illustrates a state where clearances in the axial direction are formed respectively between the washer 81 fitted to the connecting-disconnecting member 4 and the shaft portions 72 of the moving-force transmitting member 7, between the base portion 71 of the moving-force transmitting member 7 and the flange portion 533 of the plunger 53, and between the side wall portion 532 of the plunger 53 and the contacting portion 622 of the restricting member 6. However, these clearances are not necessary, and the members may be in contact with each other as long as they are not pressed in the axial direction by an urging force of the wave washer 82. For example, the flange portion 533 of the plunger 53 may be in slight contact with the base portion 71 of the moving-force transmitting member 7 by a force that is generated by remanent magnetism of the plunger 53 and that does not cause abrasion of the base portion 71. That is, "the connecting-disconnecting member 4, the moving-force transmitting member 7, and the plunger 53 are disposed with backlashes left in the axial direction" means that the connecting-disconnecting member 4, the moving-force transmitting member 7, and the plunger 53 are disposed side by side in the axial direction without being pressed in the axial direction and are rotatable relative to each other without causing an unignorable rotational resistance force (friction force).

In the present embodiment, the length obtained by adding the axial lengths of the connecting-disconnecting member 4, the moving-force transmitting member 7, and the plunger 53 is set to be shorter than the axial distance between the wave washer 82 in the natural state and the contacting portion 622 of the restricting member 6, whereby a configuration in which these members are disposed with backlashes left in the axial direction is achieved. Thus, when the wave washer 82 is at the first prescribed length in the natural state, a clearance in the axial direction is formed between the side wall portion 532 of the plunger 53 and the contacting portion 622 of the restricting member 6.

According to the embodiment described above, when the wave washer 82 is at the first prescribed length, the connecting-disconnecting member 4, the moving-force transmitting member 7, and the plunger 53 are disposed between the wave washer 82 and the contacting portion 622 of the restricting member 6, with backlashes left in the axial direction. Thus, even when these members rotate relative to each other while the actuator 5 is in the deactivated state where application of a current to the electromagnet 51 is interrupted, no rotational resistance due to friction occurs. As a result, these members smoothly rotate relative to each other and abrasion is suppressed.

Next, a modified example of the first embodiment will be described with reference to FIG. 6A and FIG. 6B.

Figure 6A:
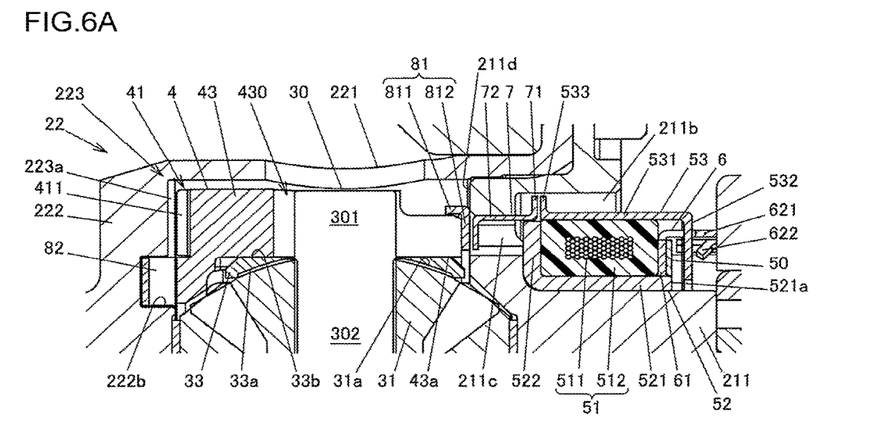
FIG. 6A is a sectional view of a differential unit according to a modified example, illustrating a deactivated state of an actuator.
Figure 6B:
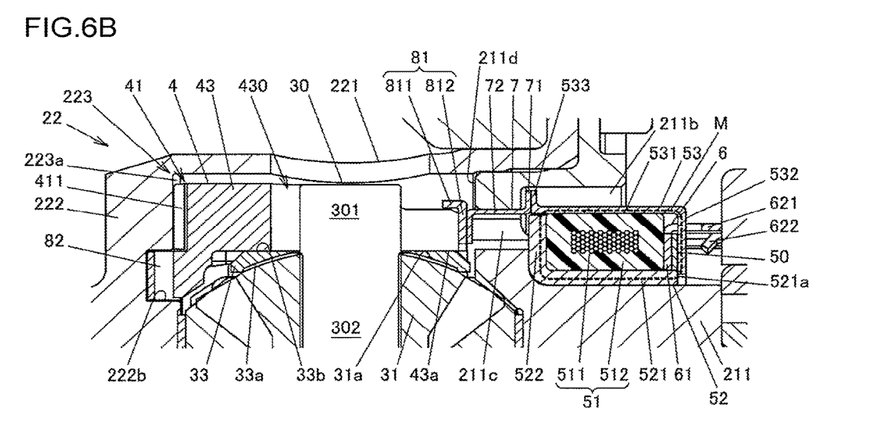
FIG. 6B is a sectional view of the differential unit according to the modified example, illustrating an activated state of the actuator.

FIG. 6A is a sectional view of a differential unit, corresponding to FIG. 5A of the first embodiment and illustrating a deactivated state of the actuator 5. FIG. 6B is a sectional view of the differential unit, corresponding to FIG. 5B of the first embodiment and illustrating an activated state of the actuator 5. In FIG. 6A and FIG. 6B, components that are the same as those described in the first embodiment are denoted by the same reference symbols as those in the first embodiment and an overlapping description thereof will be omitted.

In the first embodiment, the first prescribed length of the wave washer 82 when no current is applied to the electromagnet 51 is the axial length of the wave washer 82 in the natural state where the wave washer 82 is not compressed in the axial direction. In this modified example, the wave washer 82 is compressed in the axial direction even when no current is applied to the electromagnet 51. Thus, in this modified example, the first prescribed length that is the axial length of the wave washer 82 when the actuator 5 is deactivated is shorter than the natural length of the wave washer 82.

Thus, the connecting-disconnecting member 4 always receives an urging force of the wave washer 82, and is pressed toward the actuator 5. In this modified example, however, the washer 81 comes into contact with an axial end surface 211d of the disc portion 211 of the first case member 21 in the axial direction, whereby the urging force of the wave washer 82 is prevented from being transmitted to the moving-force transmitting member 7 and the plunger 53. Thus, as in the first embodiment, when the wave washer 82 is at the first prescribed length, a clearance in the axial direction is formed between the side wall portion 532 of the plunger 53 and the contacting portion 622 of the restricting member 6. Thus, the moving-force transmitting member 7 and the plunger 53 rotate relative to each other without being pressed to each other by the urging force of the wave washer 82. As a result, abrasion of these members is suppressed.

When the washer 81 is brought into contact with the axial end surface 211d of the first case member 21 by the urging force of the wave washer 82 and thus the connecting-disconnecting member 4 rotates relative to the first case member 21, the washer 81 slides over the axial end surface 211d of the first case member 21. However, when the vehicle is traveling in the two-wheel-drive state, the speed of relative rotation between the connecting-disconnecting member 4 and the washer 81, and the first case member 21 is lower than the speed of relative rotation between the moving-force transmitting member 7 and the plunger 53. As a result, significant abrasion that would affect the operation of the differential unit does not occur in the washer 81 or the first case member 21.

While one example embodiment of the invention has been described, the invention is not limited to the foregoing embodiment and various modifications may be made to the foregoing embodiment within the scope of the invention. For example, in the foregoing embodiment, the connecting-disconnecting member 4 and the differential case 2 are connected to each other so as to be non-rotatable relative to each other when the actuator 5 is activated, whereas the connecting-disconnecting member 4 and the differential case 2 are rotatable relative to each other when the actuator 5 is deactivated. However, the connecting-disconnecting member 4 and the differential case 2 may be connected to each other by an urging force of the wave washer 82 when the actuator 5 is deactivated. In the foregoing embodiment, the plunger 53 is disposed radially outward of the yoke 52. Alternatively, the plunger 53 may be disposed radially inward of the yoke 52.

What is claimed is:

1. A differential unit comprising:
    a differential case rotatably supported inside a differential carrier;
    a differential mechanism disposed inside the differential case, and the differential mechanism configured to receive a driving force and output the driving force from a pair of output members while allowing the output members to rotate at different rotational speeds;
    a connecting-disconnecting member configured to be movable, in an axial direction that is a direction parallel to a rotational axis of the differential case, between a connection position at which the differential case and the differential mechanism are connected to each other and a disconnection position at which the differential case and the differential mechanism are disconnected from each other, and the connecting-disconnecting member configured to allow or interrupt transmission of the driving force from the differential case to the differential mechanism;

an actuator configured to generate a moving force for moving the connecting-disconnecting member in the axial direction;

a moving-force transmitting member disposed so as to be movable in the axial direction relative to the differential case and so as to be non-rotatable relative to the differential case, and the moving-force transmitting member configured to transmit the moving force generated by the actuator to the connecting-disconnecting member; and an elastic member configured to urge the connecting-disconnecting member in a direction opposite to a direction in which the connecting-disconnecting member is moved by the moving force generated by the actuator, wherein the actuator includes an electromagnet having an annular shape and prevented from rotating relative to the differential carrier, and a plunger made of a soft magnetic material and configured to move in the axial direction while reducing a length of the elastic member from a first prescribed length to a second prescribed length using a magnetic force generated in response to application of a current to the electromagnet, an axial movement of the plunger in a direction away from the connecting-disconnecting member is restricted by a restricting member having a contacting portion to be brought into contact with the plunger, and a clearance in the axial direction is formed between the plunger and the contacting portion when the elastic member is at the first prescribed length.

2. The differential unit according to claim 1, wherein
the electromagnet is held by a yoke made of a soft magnetic material, and
the restricting member has the contacting portion, a fixed portion fixed to the yoke, and an engaged portion engaged with the differential carrier to restrict rotation of the restricting member relative to the differential carrier, and the restricting member is configured to restrict rotation of the electromagnet relative to the differential carrier.

3. The differential unit according to claim 1, wherein
the first prescribed length of the elastic member is an axial length of the elastic member in a natural state where the elastic member is not compressed, and
a clearance is formed between the connecting-disconnecting member, and the elastic member and the differential case, when the elastic member is at the first prescribed length.

4. The differential unit according to claim 2, wherein
the plunger has a first cylindrical portion facing the electromagnet in a radial direction, and a side wall portion having an annular disc shape and extending from the first cylindrical portion in the radial direction,
the yoke has a second cylindrical portion facing the electromagnet in the radial direction such that the electromagnet is held between the first cylindrical portion and the second cylindrical portion, and a rib portion configured such that the electromagnet is held, in the axial direction, between the side wall portion of the plunger and the rib portion, and
when a current is applied to the electromagnet, the plunger is moved in the axial direction by a magnetic flux that passes through a magnetic path constituted by the plunger and the yoke.

5. The differential unit according to claim 1, wherein
the moving-force transmitting member has a base portion having an annular shape and a plurality of shaft portions extending in the axial direction from the base portion, and
the shaft portions are passed through through-holes extending through the differential case in the axial direction.

6. The differential unit according to claim 1, wherein
the differential mechanism includes a pinion shaft configured such that rotation of the pinion shaft relative to the connecting-disconnecting member is restricted, a plurality of pinion gears rotatably supported by the pinion shaft, and a pair of side gears serving as the output members to be meshed with the pinion gears, and
the connecting-disconnecting member has meshing teeth to be meshed with a meshing portion provided in an inner surface of the differential case, and the connecting-disconnecting member is movable in the axial direction relative to the pinion shaft.

* * * * *